United States Patent Office 3,148,140
Patented Sept. 8, 1964

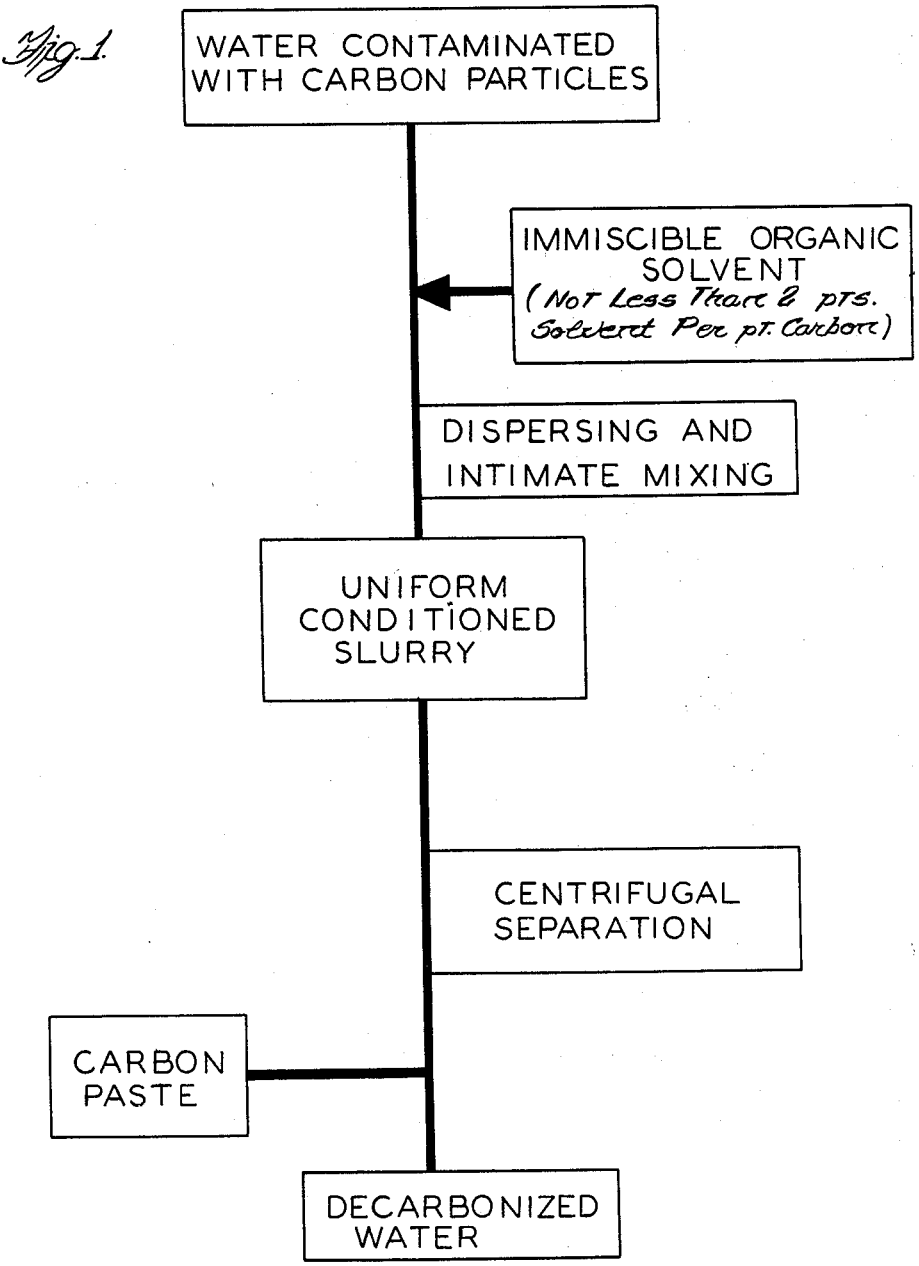

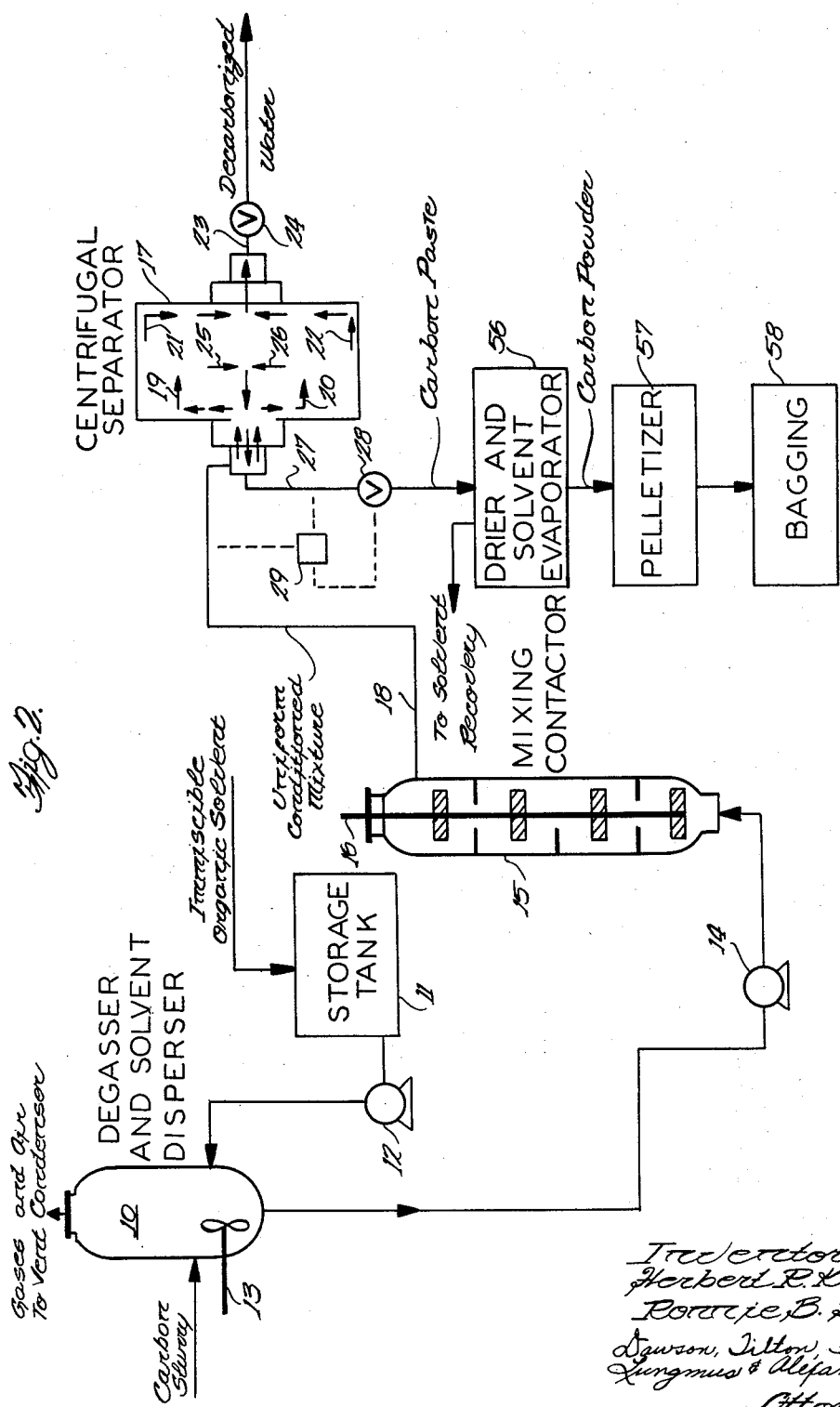

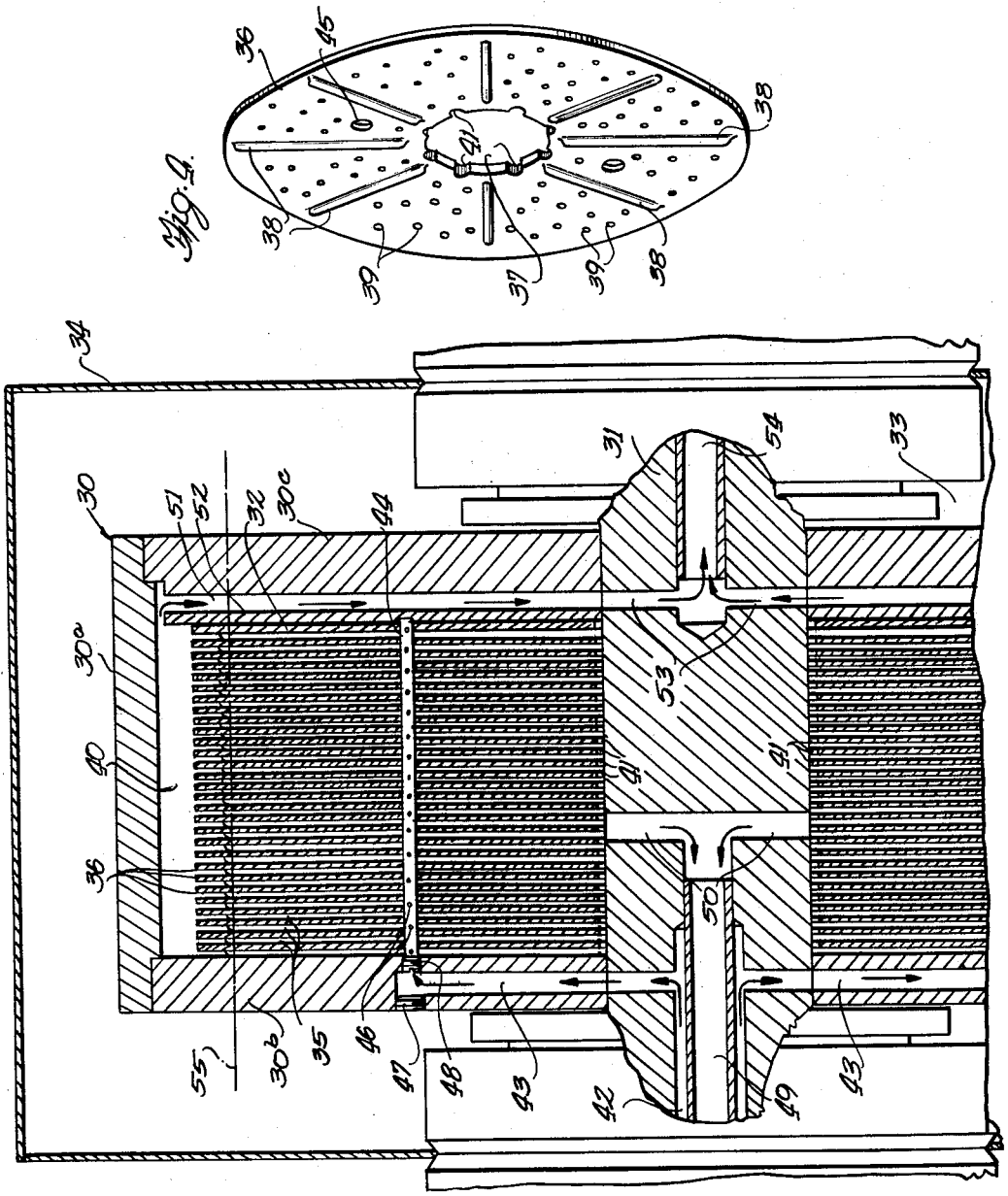

3,148,140
PROCESS FOR REMOVING CARBON PARTICLES FROM WATER
Herbert R. Kaiser, Deerfield, Ill., and Ronnie B. Smith, Box 307, Collierville, Tenn.; said Kaiser assignor to Dresser Industries, Inc., Dallas, Tex., a corporation of Delaware
Filed Oct. 10, 1962, Ser. No. 229,568
3 Claims. (Cl. 210—21)

This invention relates to a process for removing carbon particles from water. The process has particular application to the continuous treatment of water contaminated with fine carbon particles which results from quenching and/or scrubbing operations in plants carrying out processes involving the partial combustion of hydrocarbons. Such processes are in large scale commercial use for the production of acetylene and carbon black.

Gaseous mixtures resulting from the partial combustion of hydrocarbons are valuable as synthesis gases. It is known that in the production of a synthesis gas such as acetylene by the partial combustion of hydrocarbons with oxygen followed by a quenching of the flame reaction, usually with a water spray, there is unavoidably obtained as a by-product a certain amount of finely-divided carbon in the resulting product gases. If the gaseous mixture is to be utilized in a chemical process, it becomes necessary to remove the carbon from the gas prior to its utilization because of its interference with the main reactions in subsequent processes. It is desirable to use the carbon so removed as carbon black but the various prior art schemes for recovery have not been feasible from the standpoint of purity of the carbon and the economics of the system. Water scrubbing is perhaps the most popular and widespread procedure for carbon removal, although other liquids can be used, but unfortunately this procedure has its shortcomings in that the removal of the carbon from the scrub water presents great difficulty.

The problem of treating carbon particle contaminated water has been particularly acute for plants producing acetylene by the partial combustion process. Such plants use enormous quantities of water and hydrocarbon solvents, which results in a serious disposal problem. For example, an acetylene plant may use as much as one-half billion pounds of water per day to collect the carbon particles. The water discharged from the quenching and scrubbing operation may contain from 0.01 to 1.0% carbon by weight. Typically the water in an acetylene plant contains from about 0.05% to 0.50% of carbon by-product. Consequently, the water cannot be disposed of as sewerage by being dumped into streams or lakes. While minimum contamination standards vary with particular localities, it will usually be undesirable to dispose of water as sewerage or reuse which contains in excess of 250 p.p.m. and preferably not over 100 p.p.m. of dispersed carbon particles.

Heretofore the operators of acetylene plants which utilize water or hydrocarbon solvents to remove carbon particles have been forced to utilize an expensive and wasteful disposal procedure. For example, the commercial practice has been to pass the carbon-water slurry through apparatus which separates part of the water, and produces a more concentrated slurry. One type of apparatus used for this purpose is the Bulkley-Dunton soot separators. Such separators are capable of achieving only a limited concentration of the slurry, and typically produce a water concentrate containing from 1 to 5% by weight of carbon black. The water concentrate is then further processed by heating it to evaporate the water, the evaporation being continued until sufficient water is driven-off to permit the carbon black to be burned. Not only does this procedure require expensive equipment and high operating costs, but it also results in the loss of a potentially valuable by-product, the carbon. Another disadvantage of conventional processes is that the water in the carbon-water concentrate is lost by evaporation, and is not available for reuse in the operation. This is a particularly serious problem where water is relatively expensive and in short supply.

It is known that the separation of carbon black from an aqueous suspension thereof can be promoted to a certain extent by adding a small quantity of an organic solvent which preferentially wets the carbon particles. Processes involving such a procedure are described in Carter Patent No. 3,042,504 and in Wiegand et al. Patent No. 1,889,429. Heretofore, however, no process has been known for the substantially complete removal of carbon particles from aqueous suspensions.

It is, therefore, a general object of the present invention to provide a process or method for removing carbon particles from water containing such particles, especially from quench and/or scrub water employed in conjunction with a reaction process which generates such carbon particles. In this connection, a more specific object is to provide a process for the recovery of carbon particles from water containing the particles as produced in the formation of acetylene from a hydrocarbon gas. Another important object is to provide a process of the character described which accomplishes a substantially complete removal of the carbon particles from the contaminated water, thereby making it possible to dispose of the water in streams or lakes, or to reuse the water for quenching and scrubbing purposes. Further objects and advantages will be indicated in the following detailed specification.

The process of this invention is illustrated by the accompanying drawings. FIG. 1 is a generalized flow sheet which illustrates the process in its generic aspect. FIG. 2 is a detailed flow sheet illustrating a preferred embodiment of the process in the continuous treatment of a quench and scrub water slurry contained in a plant utilizing a partial combustion process for the formation of acetylene or carbon black. The apparatus employed in the embodiment of FIG. 2 includes a centrifugal separator, a preferred embodiment of which is shown in greater detail in FIG. 3. FIG. 4 is a perspective view of one of the disk elements provided in the separator of FIG. 3.

As shown in the flow sheet of FIG. 1, the present process in its generic aspect is applicable to water contaminated with carbon particles such as carbon black. The process can be applied to a water-carbon slurry containing from as low as .01% up to 10% by weight of carbon, based on the weight of the slurry. The first step in the process involves the addition of at least a certain minimum quantity of a water-immiscible organic solvent which has a greater affinity for the carbon particles than the water in the slurry. In other words, an immiscible organic solvent should be selected which is capable of preferentially wetting the carbon particles. For example, a hydrocarbon solvent can be used. For proper operation of the process not less than 2.0 parts by weight of the solvent should be utilized per part of carbon. For economic reasons, it will usually not be desirable to employ more than 10 parts by weight of solvent per part of carbon. However, for very dilute slurries containing from .01 to .4% carbon higher solvent concentrations of from 10 to 100 or more parts per part of carbon may be desirable.

In practicing the process, the solvent is dispersed in and intimately mixed with the slurry. In the mixing and contacting step, it is desirable to avoid stratification and to produce a substantially uniform mixture for the centrifugal separation. The centrifugal separation step produces decarbonized water containing less than 250 p.p.m. of carbon. The carbon is separated as a paste containing the organic solvent together with some water, the quantity of water being very small compared to the quantity produced as decarbonized water.

In one preferred embodiment of the process of this invention, the process is applied to water containing from 0.5% to 5% by weight of dispersed carbon black. Such a carbon-water slurry can be processed to produce decarbonized water containing less than 100 p.p.m. of carbon with the carbon particles being recovered in the form of a concentrated carbon paste, which is readily susceptible to further processing to obtain the carbon as a dry product. Alternatively, if desired, the concentrated form of the paste permits the carbon to be disposed of much more easily than as a dilute water slurry.

In practicing the present invention, the water-immiscible organic solvent preferably has a density not over 0.9 at 20° C. Hydrocarbon solvents, such as hexane, pentane, benzene, toluene, xylene, or light naphthas or mixed paraffin fractions, or other hydrocarbons containing from 5 to 12 carbon atoms are particularly suitable. More generally, aliphatic and aromatic hydrocarbons and mixtures thereof boiling within the range from 35 to 200° C. at atmospheric pressure are preferred. However, the organic solvent may be any compound which as a higher affinity for carbon than the slurry liquid and which preferentially wets the carbon particles while having a density differing from water by at least .08. To permit reuse of the solvent, it is desirable to employ a solvent which is volatile and readily evaporated from a carbon-water-solvent paste.

In practicing the method of this invention, it is desired to thoroughly mix the solvent with the carbon slurry, and to bring the solvent into intimate contact with the carbon particles so as to coat the particles with the solvent. This mixing and contacting can be carried out in various kinds of apparatus. The mixing should be sufficient to bring the carbon into intimate contact with the solvent. Although time and speed of agitation are important, they are merely indicative of the sufficiency of the agitation since the primary factor is the amount of energy applied to the mixture per pound of carbon.

For adequate mixing, it is desirable that at least 3 times $10^{10}$ ergs per pound of carbon mixing energy should be applied. Preferably not less than 4 times $10^{10}$ ergs of mixing energy per pound of carbon is applied through the agitator. This may be reached by high speed agitation for a short period or less agitation for a longer period depending on the economics involved but neither is critical to the process as long as the minimum amount of energy found necessary is applied. The application of from 4.3 to 4.7 times $10^{10}$ ergs of mixing energy per pound of carbon will usually be satisfactory.

As the next step in the process, the treated substantially uniform mixture is subjected to centrifugal separation. This is accomplished by passing the mixture into a radially-extending enclosed space while the space is being rotated about an axis to provide a centrifugal force field. The mixture is introduced into the space at a radially intermediate position with respect to the inner and outer boundaries of the space. In the preferred embodiment, when the organic solvent has a density less than water, water substantially free of carbon is removed from the rotating space at a position radially outward from the mixture introduction position, and the carbon is removed as a fluid paste from the space at a position radially inward from the mixture introduction position. Preferably, the mixture is pumped under pressure into the rotating space, and the space is maintained at a superatmospheric pressure.

In the specific embodiment of FIG. 2, there is shown a continuous plant for the decarbonization of an aqueous carbon black slurry, such as the quench and scrub water slurries produced in acetylene plants utilizing a process involving the partial combustion of a hydrocarbon gas.

The slurry to be processed is passed to tank 10 into which there is also continuously introduced a proportioned flow of the immiscible organic solvent. The solvent is stored in tank 11, and pumped into tank 10 by means of a pump 12. Tank 10 includes an agitator 13 which provides preliminary mixing and dispersion of the solvent. Tank 10 also functions as a degasser, provision being made for the removal of gases and air to a vent condenser through the top of the tank. The proportioned mixture is withdrawn from the bottom of tank 10 by means of a pump 14, and is pumped into the bottom of a vertically-extending mixing contactor 15 within which it flows upwardly through a series of compartments provided with agitator means. In the illustration given, contactor 15 is equipped with an agitator 16 which provides agitator paddles within the compartment. With this arrangement, the desired mixing energy, as described above, will be applied to agitator 16.

The homogeneous conditioned slurry is discharged continuously from the top of contactor 15 and passed at a uniform rate and pressure to a centrifugal separator 17 through a line 18 that communicates with the interior of the separator at a radially intermediate position as indicated by the arrow lines 19 and 20. It will be understood that the centrifugal separator includes a rotor which provides a radially-extending enclosed space that is rotated about an axis to provide a centrifugal force field. The water, being the heavier phase, as compared with the organic solvent-carbon-paste phase is thrown outwardly by the centrifugal force. The decarbonized water is removed from the outer portion of the rotor space as indicated by the arrow lines 21 and 22, the heavy phase outlet communicating with a passage discharging into a line 23 equipped with a valve 24.

The concentrated carbon black is removed from separator 17 at a position radially inward from the mixture introduction position as indicated at 25 and 26. The light phase outlets communicating with an external discharge line 27 which is equipped with a valve 28.

Preferably separator 17 operates as a sealed unit, that is, the space within the rotor does not communicate with the outside atmosphere except through the introduction and removal lines (viz. 18, 23, and 27). With this arrangement, the mixture can be introduced under pressure, and the rotating space maintained under superatmospheric pressure during the separation of the water and the carbon particles. In the operation of the device, the mixture will be introduced through line 18 at a higher pressure than the pressure of the light phase in line 27 or the heavy phase in line 23. Usually, the superatmospheric pressure within the separator will be maintained primarily by back pressure control on the light phase outlet line.

A centrifugal separator suitable for use in the process of FIG. 2 is shown in greater detail in FIG. 3. The apparatus of FIG. 3 includes a rotor casing 30 which is mounted co-axially on a shaft 31 and provides a radially-extending chamber 32 therein. The shaft extends horizontally and is rotatably mounted on a base 33, and a case 34 extends above the base. In the illustration given, rotor 30 includes a cylindrical outer band 30a, and end plates 30b and 30c.

Rotor space 32 is divided into a series of parallel flow passages 35 alternating with a plurality of axially spaced rotor discs 36. The discs 36 terminate short of the inside of outer casing wall 30a to provide an axial flow passage 40 at the periphery of rotor space 32.

The slurry solvent mixture is introduced through shaft passage 42, which communicates with a plurality of radially extending passages 43. Each of the passages 43 communicates with an inlet tube 44 which extends across space 32 through discs 36. As shown in FIG. 4, the discs 36 can be provided with openings 45 for receiving the inlet tubes 44.

The inlet tubes 44 are provided on one side, preferably the trailing side with respect to the direction of rotation, with a plurality of inlet ports 46. The mixture will, therefore, flow from shaft passage 42 through radial passages 43 into tubes 44 for discharge from the inlet ports in a uniform distribution across the rotor space. With the construction shown, the tubes 44 can be inspected or removed by unscrewing plugs 47 and the enlarged threaded tube end 48.

Within the rotating shaft there is also provided a passage 49 which is concentric with the mixture inlet passage 42, and which communicates at its inner end with laterally extending shaft passages 50. Passages 50 provide for the removal of the light phase, the carbon paste, from the innermost portion of the rotor space.

The heavy phase, being the decarbonized water, is removed through an annular space 51 which is provided between end plate 30c and a disc 52. As shown in FIG. 2, the disc 52 also supports one end of the inlet tubes 44. The annular space 51 communicates at its inner end with radially extending shaft passages 53 which in turn connect with shaft passage 54 through which the heavy phase is discharged to the exterior of the apparatus. A tubular type of return can be used for removing the decarbonized water from the outer portion of the rotor.

While the vane-equipped vertically-extending discs within rotor sapce 30 are preferred, it will be understood that other elements can be employed which promote the desired separation. For example, concentric perforated cylindrical bands can be used instead of the discs. If desired, such bands can be employed in combination with the discs, the rings being positioned in the outer portion of the rotor space, and the discs in the inner portion.

Means are provided for driving the rotor in FIG. 3 at a controlled rotational speed. For example, the rotor can be driven by fluid drive and motor, permitting change of r.p.m. as desired, and acceleration to operating speed without excessive torque. Also, in accordance with well-known practice, at each end of the rotating shaft there are provided hydraulically balanced mechanical seals for feeding and withdrawing liquids continuously. For use in the method of this invention, three seals are provided, one for introduction of the mixture, one for removal of the decarbonized water, and one for removal of the carbon paste. The mounting of the shaft and the construction of the mechanical seals as well as other details of this kind of apparatus, is described in prior Patents 2,758,783 and 2,758,784, as well as in Patent 2,670,132.

The construction of one of the rotor discs 36 is shown more clearly in FIG. 4. It consists of a circular disc which is provided with a central opening 37 that fits over the rotating shaft. A plurality of radially-extending vanes 38 are provided on one side of disc 36. These vanes extend outwardly from the surface of the discs and serve as spacers between the discs in the assembled rotor. The vanes also define radially extending flow channels between the discs. The discs thereby permit radial flow of the solvent-slurry mixture within the spaces between the discs while arresting circumferential flow. The discs 36 are provided with a plurality of pressure equalization perforations 39. The discs 36 also provide a plurality of cutouts or serrations 41 around central opening 37 which permit axial flow at the inside of rotor space 32 adjacent shaft 31.

In the operation of a centrifugal apparatus like the one illustrated in FIG. 3, it will usually be desirable to maintain the principal interface (viz., the boundary between the heavier water phase, and the lighter carbon black-hydrocarbon solvent phase) at a position radially outward of the mixture inlet position. For example, the principal interface can correspond with the position indicated by the dotted line 55 in FIG. 3. The position of this interface can vary, but there should be a water layer of substantial radial extent maintained at the outer periphery of the rotor space. One simple way of maintaining the desired control of the interface is by means of a differential pressure controller 29, as indicated in FIG. 2. The control unit 29 is connected to mixture inlet line 18 and also to the light phase outlet line 27. It is actuated in response to differential pressure between these two lines. In other words, control unit 29 opens and closes valve 28 so as to maintain a uniform pressure differential between the two lines. The result of this is to control the position of the principal interface. When this type of differential pressure control is used, the valve 24 on the heavy outlet line can be fully opened, and no back pressure maintained on the heavy phase. This control procedure and the instrumentation utilized therein is described in greater detail in the Journal of the American Oil Chemists' Society, July 1959, pages 277–280.

As indicated previously, the carbon will be removed in the form of a flowable paste as the light phase from the centrifugal separator. This paste will contain substantially all of the organic solvent and the carbon together with a small proportion of the water of the slurry. The proportion of water in the paste will usually range from 20 to 50% by weight. The organic solvent and residual water can be removed from the paste by evaporation or distillation, and the solvent recovered for reuse in the process. The carbon concentrate can then be processed to produce commercial grade carbon, which can be used in paints, inks, etc. The carbon can also be converted to electrically conductive carbon.

In the flow sheet of FIG. 2, the carbon paste discharged from the centrifugal separator 17 is shown as being passed to a dryer and solvent evaporator 56. The vapors from this unit, comprising the organic solvent and residual water, are passed to a solvent recovery unit, as indicated, thereby permitting the solvent to be returned to the process, for example, to storage tank 11. The carbon black in the form of a powder is discharged from dryer 56 and passed to a pelletizer 57. The pelletized carbon is passed to bagging at 58.

This invention is further illustrated by the following specific examples which are intended as illustrative rather than limiting.

*Example I*

Into an agitator-equipped tank was charged 500 gals. of slurry water containing from 3.5 to 4.0% by weight carbon particles. Hexane was added in a ratio of approximately 3.3 pounds per pound of carbon present in the slurry. The mixture was thoroughly agitated by an electric motor driven agitator. The resulting feed, which was substantially uniform, was pumped at the rate of approximately 3 gallons per minute and about 40 p.s.i. to a centrifugal separator similar to the one illustrated in FIG. 3. The centrifugal separator had a radius of 36 inches, and was rotated at 2,000 r.p.m. After the separator reached a steady operating condition, decarbonized water containing less than 50 parts per million of carbon was removed as the heavy phase. The carbon was removed as the light phase in the form of a flowable paste under a back pressure of about 30 p.s.i. This paste contained about 15% carbon, 35% water, and around 50% hexane. The heavy water phase was removed from the outer portion of the rotor and the light carbon paste phase was removed from the inner portion of the rotor. A differential pressure of about 10 p.s.i. was maintained between the mixture inlet and the light phase outlet. The heavy phase outlet was operated without back pressure.

*Example II*

The procedure described in Example I was followed using similar conditions and apparatus, except that a light mineral oil containing a mixture of paraffin hydrocarbons was substituted for the hexane, and introduced at the rate of about 4.2 parts per part of carbon. The mineral oil had the following specification: sp. gr. 0.784 at 60°/60° F.; distillation range at 760 mm. Hg 314–383° F. The decarbonized water leaving the centrifugal separator had less than 100 parts per million of carbon and the flowable paste contained 13% carbon, 32% water, and about 55% mineral oil.

*Example III*

The invention is practiced commercially by employing an apparatus installation like the one illustrated in FIG. 2. The organic solvent is introduced into tank 19 at the rate of 3 to 4 parts of organic solvent per part of carbon in the slurry, which will typically contain from 2 to 5% by weight of carbon black. The proportioned mixture is passed to the mixing contactor 15 wherein approximately 4.5 times $10^{10}$ ergs per pound of carbon of mixing energy is applied to assure that the mixture is substantially uniform and properly conditioned for maximum effectiveness of the centrifugal separation. The organic solvent is a hydrocarbon boiling within the range from 35 to 200° C. having a density not over 0.9. Aliphatic hydrocarbons such as pentane, hexane, heptane, heptene, octane, octene, or other saturated or unsaturated paraffin hydrocarbons, either straight or branch chain, and containing from 5 to 12 carbon atoms can be used. Alternatively, the organic solvent can be an aromatic hydrocarbon containing from 6 to 8 carbon atoms, such as benzene, toluene, and xylene. The water discharged from the centrifugal separator as the heavy phase will contain less than 100 p.p.m. of carbon, while the carbon paste discharged as the light phase will contain substantially all of the carbon from the original slurry together with the organic solvent and a small percentage of the water originally presented in the slurry. Typically the paste will contain 1 part of carbon per 3 to 4 parts of the organic solvent together with 2 to 3 parts by weight of water.

Of the particular advantages of this process for the removal of carbon particles from a water slurry, the discharge of the water from the centrifugal separator in a substantially carbon free state is of prime importance. This permits the water to be disposed of in streams or lakes or to be reused in the same process or for other purpoes. Ninety percent or more of the water can be recovered as the decarbonized heavy phase. Another advantage which is also due to the unique and superior separation afforded by the process of this invention is the recovery of the carbon in a highly concentrated form which can be readily processed to yield commercial grade carbon. The carbon paste can be recovered as the light phase containing less than 50% water by weight.

The superatmospheric pressure at which the centrifugal separator is operated can vary over a considerable range. Preferably, the mixture is introduced at a pressure of from 15 to 50 p.s.i.g., while the pressure on the light phase outlet can be controlled to give a 5 to 25 p.s.i. differential.

The temperature of the mixture can vary over a considerable range. For example, temperatures of from 50° F. to 150° F. can be used. It is preferred to avoid temperatures which are so low as to appreciably increase the viscosity of the feed mixture or separated paste. In the preferred embodiment using the closed pressurized separator, it is possible although not desirable to employ temperatures above the normal boiling point of the solvent at atmospheric pressure. For most applications, the temperature is preferably maintained at from about 80 to about 100° F.

A similar procedure can be applied to the separation of carbon particles from water by utilization of a water-immiscible organic solvent having a density greater than water. For example, chlorinated hydrocarbon solvents, such as trichlorethylene, carbon tetrachloride, and methylene chloride, having from 1 to 3 carbon atoms, can be used. In this modification, the organic solvent carbon paste will be removed as the heavy phase and the decarbonized water as the light phase.

While in the foregoing specification this invention has been described in relation to certain preferred embodiments thereof, and many details have been set forth for purpose of illustration, it will be apparent to those skilled in the art that the invention is susceptible to other embodiments, and that many of the details set forth herein can be varied considerably without departing from the basic principles of the invention.

We claim:

1. In a process for separating dispersed carbon particles from water contaminated with from .01 to 10% carbon by weight, wherein there is introduced into said contaminated water at least 2 parts by weight of a water-immiscible organic solvent per part of said carbon particles, said solvent having a lesser density than water and wetting said carbon particles perferentially to water, the process improvement for substantially completely freeing said water of carbon contamination, comprising mixing said solvent with said contaminated water and intimately contacting said solvent with said carbon particles until the resulting mixture is substantially homogenous, passing the homogenous mixture thus obtained into a radially-extending enclosed space being rotated about an axis to provide a centrifugal force field, said mixture being introduced into said space at a radially intermediate position with respect to the inner and outer boundaries of said space, removing said carbon particles as a fluid paste at a position radially inward from said mixture introduction position, and removing water containing less than 250 parts per million of carbon particles from position adjacent the outer boundary of said space.

2. In a process for separating dispersed carbon particles from water contaminated with from .5 to 5% carbon by weight, wherein there is introduced into said contaminated water from 2 to 10 parts by weight of a water-immiscible organic solvent per part of said carbon particles, such solvent having a lesser density than water and wetting said carbon particles preferentially to water, the process improvement for substantially completely freeing said water of carbon contamination, comprising mixing said solvent with said contaminated water and intimately contacting said carbon particles until the resulting mixture is substantially homogenous, pumping the homogenous mixture thus obtained into a radially-extending enclosed space being rotated about an axis to provide a centrifugal force field, said mixture being introduced into said space at a radially-intermediate position with respect to the inner and outer boundaries of said space, removing said carbon particles as a fluid paste at a position radially inward from said mixture introduction position, and removing water containing not over 100 parts per million of said carbon particles from said space at a position radially outward from said mixture introduction position.

3. In a process for removing dispersed particles of carbon black from water contaminated therewith in the production of acetylene from hydrocarbon gas, said contaminated water containing from .5 to 5% by weight of said carbon black, wherein there is introduced into said contaminated water from 2 to 10 parts by weight of a hydrocarbon solvent per part of carbon black, said solvent having a density of not over 0.9 at 20° C., the process improvement for substantially completely freeing said water of carbon contamination, comprising mixing said solvent with said contaminated water and intimately contacting said carbon black with said solvent until the resulting mixture is substantially homogenous, pumping the homogenous mixture thus obtained into a radially-extending enclosed space being maintained under a super-atmospheric pressure and being rotated about in axis to provide a centrifugal force field, said mixture being introduced into said space at a radially intermediate position with respect to the inner and outer boundaries of said space, removing said carbon black as a fluid paste from said space at a position adjacent the inner boundary of said space, and removing water containing not over 100 parts per million of said carbon black from said space at a position adjacent the outer boundary of said space.

References Cited in the file of this patent

UNITED STATES PATENTS

| | | |
|---|---|---|
| 2,992,906 | Guptill | July 18, 1961 |
| 3,027,390 | Thurman | Mar. 27, 1962 |